United States Patent [19]

Melber

[11] Patent Number: 5,112,657
[45] Date of Patent: May 12, 1992

[54] SIMULATED MARBLE PRODUCTS

[75] Inventor: George E. Melber, Buffalo, N.Y.

[73] Assignee: Pierce & Stevens Corporation, Buffalo, N.Y.

[21] Appl. No.: 551,074

[22] Filed: Jul. 11, 1990

[51] Int. Cl.⁵ .................................... B32B 5/16
[52] U.S. Cl. ................................. 428/15; 428/323; 428/327; 428/330; 428/403; 428/407
[58] Field of Search ............. 428/327, 330, 323, 403, 428/407, 402, 15

[56] References Cited

U.S. PATENT DOCUMENTS

| | | | |
|---|---|---|---|
| 3,640,787 | 2/1972 | Heller | 156/77 |
| 4,722,943 | 2/1988 | Melber et al. | 521/57 |
| 4,829,094 | 5/1989 | Melber et al. | 521/57 |
| 4,839,394 | 6/1989 | Champion | 521/55 |
| 4,843,104 | 6/1989 | Melber et al. | 521/54 |
| 4,849,456 | 7/1989 | Champion | 521/54 |

*Primary Examiner*—Paul J. Thibodeau
*Assistant Examiner*—Mark Forman
*Attorney, Agent, or Firm*—Waldron & Associates

[57] ABSTRACT

In the present invention, polymer binder systems are filled with inert fillers, such as calcium carbonate, and with specific thermoplastic microspheres bearing a surface coating of an inert particulate material compatible with the polymer binder system. The preferred inert particulate material on the microspheres is particulate or fibrous forms of calcium carbonate. The microspheres have a very low density, and the inert particulate for fibrous coating is thermally bonded to surface thereof. The microspheres may be employed in proportions up to as much as about 70 volume percent of the casting or molding composition, resulting in a product of exceptionally low weight and density.

The products of the present invention also provide high impact strength, high resistance to cracking and crack propagation, high tensile and yield strength, and a high modulus of elasticity, particularly compared to the usual cast marble products known to the art.

9 Claims, No Drawings

SIMULATED MARBLE PRODUCTS

BACKGROUND

1. Technical Field

The present invention relates to the technical field of filled polymer castings and moldings and particularly to simulated marble products, such as plumbing fixtures, docorative panels, and the like, made from filled polymers.

2. Prior Art

It has long been recognized that marble products may be substituted by cast polymer castings and moldings. Such products offer substantial savings in cost, weight, labor requirements, and a variety of other features. Enhanced physical properties, such as resistance to cracking, impact, and the like have also been among the objectives of such efforts to provide substitutes for marble products. Considerable efforts have been made to achieve products which simulate the appearance of marble, and particularly polished marble through direct casting of desired product shapes. Such products have met with considerable success and market acceptance.

In general terms, such products are based on a polymer binder, usually a thermoset polymer binder, and a high loading of particulate or granular fillers, particularly calcium carbonate. Such formulations can be directly molded or cast into quite complex product shapes without substantial requirements for working the formed product.

These products have ordinarily been quite heavy, imposing considerable costs for shipping, handling, installation, and the like. It has long been an objective of the art to find effective techniques to reduce the weight of such products.

In addition, the high filler loadings employed in order to achieve marble-like properties and appearance have resulted in low physical properties, including tensile strength, impact and crack resistance, yield strength, and the like. While these properties may be improvements over marble itself, they tend to be poor compared to other filled polymer products generally.

It has become common to employ hollow ceramic or glass spheres as a part of the filler component in such systems to reduce weight. Such hollow spheres are friable, particularly during the vigorous mixing required in formulating such compositions, and while some weight reductions are achieved by virtue of such inclusions, the effect is often limited by the lack of strength of such additions. In addition, the physical properties achieved are not greatly improved by hollow glass or ceramic spheres.

The weight reductions that are achieved by such techniques are limited by the size and by the friability of the hollow glass or ceramic spheres. In most usual circumstances, such materials have a diameter which averages about 100 micrometers, and a distribution of sizes from as little as 10 to as much as 350 micrometers.

In U.S. Pat. Nos. 4,839,394 and 4,849,456, (Champion) the use of hollow glass or ceramic spheres is improved upon by combining these materials with hollow thermoplastic microspheres. The glass or ceramic spheres are blended with the thermoplastic microspheres, and mixed to induce an electrostatic attraction such that the microspheres are attracted to the surface of the larger glass or ceramic spheres. In subsequent mixing operations, the microspheres furnish a cushioning effect, reducing the fragmentation of the more fragile glass or ceramic material. In the molded or cast products, the microspheres are said to improve the impact resistance and other related physical properties.

The thermoplastic microspheres employed in the foregoing patents are hollow spheres of a thermoplastic polymer which enclose a physical blowing agent, such as a volatile hydrocarbon. The most commonly available and widely used of such materials are polyvinylidene chloride homopolymer or copolymer based materials.

In Champion, the breakage of the glass or ceramic spheres is reduced, but not eliminated. In addition, the amount that can be employed continues to be limited, and the weight savings attained is consequently less than might otherwise be desirable. There is some gain in physical properties of the products, in impact and crack resistance, but the products remain quite fragile. In addition, the coating of the hollow ceramic spheres with the microspheres limits the binding of the polymer binder to the surface of the ceramic material, leaving these materials only partially bonded into the final product. This results in undesirable levels of voids, air entrainment, potential problems with the polymer curing system, and the creation of sites for fracture, crack initiation, and crack propagation through the cast product.

OBJECTS OF THE INVENTION

It is an object of the present invention to provide a method of making cast or molded simulated marble products, and products so made, with improved properties, and particularly with substantially reduced weight, increased impact resistance, crack resistance, tensile and yield strengths.

Another object of the present invention is the elimination from cast or molded simulated marble products of the need for hollow ceramic or glass spheres.

SUMMARY OF THE INVENTION

In the present invention, polymer binder systems are filled with inert fillers, such as calcium carbonate, and with specific thermoplastic microspheres bearing a surface coating of an inert particulate material compatible with the polymer binder system. The preferred inert particulate material on the microspheres is particulate or fibrous forms of calcium carbonate. The microspheres have a very low density, and the inert particulate for fibrous coating is thermally bonded to surface thereof. The microspheres may be employed in proportions up to as much as about 70 volume percent of the casting or molding composition, resulting in a product of exceptionally low weight and density.

The products of the present invention also provide high impact strength, high resistance to cracking and crack propagation, high tensile and yield strength, and a high modulus elasticity, particularly compared to the usual cast marble products known to the art.

DETAILED DISCLOSURE

The polymer binder system employed in the present invention can be any of those employed in the art. Selection of a particular binder polymer and other binder components, such as crosslinking agents, cure catalysts, and the like are well within the ordinary skill in the art and form no part of the present invention.

As those of ordinary skill in the art are aware, the most common and preferred binders for such uses are the unsaturated polyester resins (vinylesters), cross linked by suitable free radical initiators and related curing agents, accelerators, and the like.

For particular systems, it may be desirable to employ other polymer binder systems, as those of ordinary skill in the art will recognize, such as epoxy resins, polyurethanes, phenolics, polyureas, polyimides, polyamides, polycarbonates, and the like. In most circumstances, cross-linked varieties of such polymer systems, i.e., thermoset polymers are preferred, although in some particular circumstances, thermoplastic polymer systems may be employed, and are not excluded from the present invention.

The inert filler may be any of the materials heretofore employed in the art. The selection of the particular filler materials is not a part of the present invention.

The inert filler will ordinarily be calcium carbonate, which in finely divided particulate or granular form, and which offers many of the properties of marble to the formulation. As those of ordinary skill in the art are aware, particulate calcium carbonate is generally available in somewhat elongated, fibrous form which is desirable to lend an increment of tensile reinforcement to the cast or molded product. It is also common to employ aluminum tri-hydrate, alone or in combination with calcium carbonate.

The preferred calcium carbonate may be combined, as those of ordinary skill in the art are aware, with other inert fillers, diluents, and the like, as are customary in the art.

The microspheres employed in the present invention are hollow thermoplastic spheres, containing a blowing agent, normally a physical blowing agent such as a volatile hydrocarbon, within the central cavity of the hollow structure. In addition, these microspheres have a surface coating of an inert particulate or fibrous barrier coating material on the outer surface of the microsphere beads.

Such microspheres can have a wide range of particle sizes, from about 5 micrometers, up to a few millimeters. In the present invention, it is preferred that the diameter of the microspheres be generally less than about 100 micrometers, and preferably on the order of from about 10 micrometers up to as much as about 50 micrometers. Large sizes of the microspheres limits the volumes that can be effectively employed in the formulations of the present invention, and are not preferred.

The microspheres in the present invention are in expanded form, having a microsphere density of, generally, less than about 0.06 gm/cc, and preferably less than 0.04 gm/cc. It is most preferred that the density of the microsphere component be less than about 0.025. The composite density of the microsphere with its added barrier coating will be higher, the value of which will depend on the amount of the coating material and its density, as discussed infra.

Such microspheres and their structure and manufacture as used in the present invention are generally disclosed in U.S. Pat. Nos. 4,722,943; 4,829,094 and 4,843,104, the disclosure of which is hereby incorporated by reference.

In the present invention, it is preferred that the inert particulate or fibrous barrier coating be the same material, or a component of the same materials, employed as the inert filler component of the simulated marble product. This will most often be calcium carbonate, and preferably the fibrous calcium carbonate as discussed hereinabove.

The most common uses of expanded, dry microspheres resides in the exceptional ultra-low density characteristics, which has led to drastic changes in the ways in which the weight and volume relationships of such materials are considered. As a general rule of thumb, the addition of one percent by weight of the expanded microspheres will represent the substitution of about twenty percent by volume or even more in typical systems.

We have now made an improvement in the manufacture of such microspheres, which differs from the procedure disclosed in U.S. Pat. Nos. 4,772,943; 4,829,094; and 4,843,104, as hereinafter described:

The occurrence of agglomerates has heretofore been considered the result of the microsphere expansion. Even by the procedure of our prior patent, supra, it has been considered necessary to accept a level of agglomerates of from about 3 to 10 percent of the expanded beads, and in some conditions, far higher levels are common. We have found, however, that a major contributing factor in the occurrence of agglomerates is to be found in the characteristics of the wet cake and the shortcomings of the expansion and drying procedures heretofore employed. We have learned that the wet cake must be subjected to adequate levels of mixing at high shear during the drying operation to assure complete separation of beads prior to the expansion in order to reduce agglomeration.

Our discovery of the significance of high shear mixing dictates that the mixing and drying operation be completed in a separate and distinct step prior to expansion. While these are set out in more detail, infra, the benefits can be summarized as follows:

1. Expansion to lower densities than heretofore achieved is now possible. The microsphere density can be less than 0.03, often 0.02 to 0.015 g/cm$^3$.

2. Lower proportions of the surface barrier coating can now be employed without a resulting increase in the proportion of agglomerates in the product as heretofore expected.

3. Closer control of the bead expansion is achieved, resulting in lower proportions of under-expanded, over-expanded and disrupted beads.

4. Process control requirements are simpler and equipment requirements are less demanding, permitting operation in less expensive equipment with reduced control requirements while still achieving higher levels of product quality, uniformity and productivity.

5. The level of agglomerates consistently achieved, of less than 1%, often maintained at less than 0.1%, of the product has now permitted the elimination of post-expansion processing to separate out agglomerates from the product.

6. The combination of all the foregoing result in materially reduced production costs with materially increased product quality, and a broad range of product than heretofore available.

It has now been observed that surface barrier coatings can be employed, in surprisingly modest proportions by weight, which prevent agglomeration of the microspheres upon both drying and expansion, and that such materials actively and effectively suppress dusting of the expanded products as well. This combination of features and observations has led to the development of effective drying, and subsequent expansion, of microspheres by first mixing and drying the microspheres with the surface barrier coating until substantially all the free water is removed, followed by controlled expansion to a desired density and recovery of the dry, free-flowing product. The microspheres remain in the desired unicellular condition, and substantially free of undesirable agglomeration. The subsequent expansion can be up to the higher limits, as established by prior efforts in the art, to achieve microsphere densities less than 0.03 g/cm$^3$ and as low as 0.015 to 0.02 g/cm$^3$.

It is important to the present invention that in the context of most uses of the dry, expanded microspheres, it is the volumetric considerations which are most often of dominant importance, so that even quite substantial proportions of the surface barrier coatings on a weight basis form a negligible or very minor component on a volumetric basis. For example, employing calcium carbonate as the surface barrier coating, the volume and weight relationships of the dry, expanded microspheres with varying amounts of calcium carbonate show the relationships detailed in TABLE I.

TABLE I

EXPANDED MICROSPHERES BLENDED
WITH CALCIUM CARBONATE
MICROSPHERE CONTENT OF PRODUCT

| WEIGHT % | VOLUME % |
|---|---|
| 80 | 99.8 |
| 50 | 99.3 |
| 20 | 97.1 |
| 10 | 93.8 |
| 5 | 87.7 |
| 3 | 80.7 |

NOTES: Data are based on Microspheres at 0.02 g/cm$^3$ and the calcium carbonate (calcite) at 2.71 g/cm$^3$.

As the relationships in Table I show, even quite large proportions of calcium carbonate by weight represent a minor fraction of the volume of the dry expanded product. Particularly since it is possible to find such materials as entirely conventional fillers and/or pigments in many polymer systems of interest for the use of the microspheres, and particularly the calcium carbonate which is the primary filler employed in such formulations, it is generally preferred to employ such materials as the surface barrier coatings in the present invention. It is also of interest to employ fibrous forms of such materials, as well as reinforcing fillers, as particularly preferred surface barrier coatings when possible, for their added benefits as constituents of the final cast product. It will often be advantageous to employ both particulate and fibrous surface barrier coatings, or more than one type of surface barrier coating in mixtures and combinations with one another.

In most uses of the dry expanded microspheres, such materials will often be a constituent of the formulation intended by the end user in any event, and it is simply necessary to make corresponding reductions in the loading of such fillers in the formulation to compensate for the increment included with the microspheres. A wide diversity of such materials will meet the functional requirements of the present invention, so that it is possible in almost all circumstances to find a surface barrier coating compatible with the formulating requirements of the intended end use. Calcium carbonate is preferred.

It has been observed that with appropriate levels of such surface barrier coatings, the tendency of the microspheres to agglomerate, or to stick to heated surfaces of drying equipment and expanding equipment is effectively eliminated, and the dusting of the final expanded product is materially reduced, if not effectively eliminated.

By the achievement of the processing characteristics of the mixture, it has become possible to employ equipment that permits effective drying and subsequent expansion at temperatures where the need for an inert atmosphere is eliminated without the introduction of substantial fire and explosion hazards. This represents a quite material reduction in expense, and a real gain in system safety.

Microspheres are generally available in the form of a wet cake, which is typically about 40 percent water, about 60 percent unexpanded microsphere beads, and minor additional amounts of the materials employed in the manufacture of the beads by the process of the Morehouse patent, i.e., "wetting agents".

Readily available microspheres are available from Pierce & Stevens Corporation, 710 Ohio Street, P.O. Box 1092 Buffalo, N.Y. 14240-1092, which are predominantly polyvinylidene chloride microspheres with an inclusion of iso-butane as the blowing agent. Some of the microspheres presently available contain comonomers in minor proportions in the bead polymerization. The available materials are preferred in the present invention, primarily for their availability and reasonable cost. The copolymers generally leave higher $T_g$ and expansion temperatures.

As the Morehouse patent indicates, microspheres can be made from a rather wide diversity of thermoplastic polymers. In practice, the commercially available microspheres are generally limited to polyvinylidene chloride or a random copolymer, vinylidene chloride and acrylonitrile, or a random terpolymer of polyvinylidene chloride, acrylonitrile, and divinyl benzene. Microspheres of other materials, such as polyacrylonitrile, polyalkyl methacrylates, polystyrene, or vinyl chloride, are known, but these materials are not widely and generally available. The present invention is applicable to any thermoplastic of which microspheres are made, but since the polyvinylidene chloride based materials are those most available to the art, the discussion herein will be directed predominantly to those materials. As those of ordinary skill in the art will readily recognize, the processing parameters will require adjustment to accommodate differing polymer materials.

A wide variety of blowing agents can be employed in microspheres. Again, the commercially available materials are more limited in range, most often being selected from the lower alkanes, suited to the polyvinylidene chloride polymer. As the Morehouse patent clearly sets forth, the selection of the blowing agent is a function of the particular thermoplastic polymer employed, and in the context of the present discussion, those ordinarily used with the commercially available microspheres are given the greatest attention. Isobutane is most often used with polyvinylidene chloride microspheres.

In unexpanded form, the microspheres can be made in a variety of sizes, those readily available in commerce being most often on the order of 2 to 20 microns, particularly 3 to 10 microns. When expanded, these materials will have bead diameters on the order of 10 to 100 micrometers. It is possible to make microspheres in a wider range of sizes, and the present invention is applicable to them as well. It has been demonstrated, for example, that microspheres can be made from as small as about 0.1 micron, up to as large as about 1 millimeter, in diameter, before expansion. Such materials are not generally available.

While variations in shape are possible, the available microspheres are characteristically spherical, with the central cavity containing the blowing agent being generally centrally located.

Dry, unexpanded microspheres typically have a displacement density of just greater than 1 g/cm³, typically about 1.1.

When such microspheres are expanded, they are typically enlarged in diameter by a factor of 5 to 10 times the diameter of the unexpanded beads, giving rise to a displacement density, when dry, of 0.1 or less, most often about 0.03 to 0.06. In the present invention is now possible to achieve expanded densities as low as 0.015 to 0.020 g/cm³.

While the microspheres are produced in an aqueous suspension, it is common to break and de-water and suspension, and to supply the microspheres in the form of a "wet cake" of about sixty percent solids. This avoids shipping larger than necessary quantities of the aqueous system.

The solids content of the wet cake is substantially all unexpanded microspheres, but also includes the suspension components, including the wetting agents, so that the remaining water in the wet cake is extremely difficult to remove.

The drying operation is based on the use of conventional contact type, indirect heat exchange mixing driers with high speed, high shear capabilities. A wide diversity of types of equipment are applicable. In general terms, the requirements are for good temperature control, good mixing of powder and granular materials, and high shear, optionally with operation at reduced pressure provided, and the removal and recovery, preferably with condensation of the evaporated water and entrained blowing agent and wetting agents. Active cooling of the microspheres, either in the mixing drier itself, or in ancillary equipment is also optional.

We believer, although we have no wish to be bound thereby, that the occurrence of agglomerates in processes not employing high shear is the result of adhesion between microsphere beads caused by the action of the wetting agents at higher concentrations as water is removed. Once agglomerates are formed, the wetting agents are "sheltered" from the drying operation and serve to bind pluralities of beads together in a firmly adherent clump. We suggest that the adhesive bond formed is rather weak, and is effectively broken down when subjected to high shear; additional water is then freed for removal; and remaining increments of such materials no longer have adhesive properties, so that agglomerates do not reform.

The measurement of shear in fluidized systems is a complex matter, and difficult to measure directly. Where the breaking of agglomerates of particles is desired, it is known that the "smearing" action produced under laminar flow conditions is more effective than the results of turbulent flow. Such milling of particulates is practiced in a diversity of arts and is generally well known.

In liquid-solid systems, it is well known to employ Reynolds numbers to evaluate grinding and mixing conditions. Where the laminar flow conditions are desirable for optimum pigment grinding into a paint vehicle, for example, it is recommended that the Reynolds number of the mixing not exceed 2,000.

In the context of the present procedure, involving the mechanical fluidizing of solids in a gas phase (i.e., air), such parameters are less well developed, but we have observed that operations under similar criteria, i.e., Reynolds number as calculated of less than 2,000, correlate well with the objectives. Specific equipment is discussed below.

Reynolds numbers are a dimensionless value given by the following equation:

$$Re = \frac{\rho v \chi}{\eta}$$

where $\rho$=density (g/cm³), $v$=velocity (cm/sec)·$\chi$=-linear dimension (cm), and $\eta$-viscosity (poise). In the preferred mixing equipment based on a rotating disk mill, the linear dimension $\chi$ is the shortest distance from the mixing chamber wall to the disk blade, in a direction normal to the plane of the disk.

Broadly speaking, the present procedure may be practiced over a wide range of Reynolds numbers, from as low as about 1,000, up to as high as 8,000 or even about 10,000. As those of ordinary skill in the art will recognize, it will generally be desirable to operate at Re of from about 1,000 to about 3,000, and preferably about 1,500 to about 2,250. It is most preferred, when such conditions can be achieved in the equipment employed, to operate at or just below a value of Re=2,000, say from about 1,800 to 2,000.

As calculated Reynolds numbers materially above or below the preferred values, the present method remains effective, but less efficient, requiring longer processing times and/or tolerance of somewhat higher proportions of agglomerates in the product. The outer limits are defined by shear forces so low that agglomerates are not reduced during processing or so high that the bead structure is disrupted by the impact of the blade tips.

Because of the turbulence affected by the plow mixer in the mechanically fluidized mixing operation, true laminar flow is often not achieved in the present operation. We have observed, as a consequence, that the range of desirable Reynolds numbers to achieve effective results is rather broader than in simpler systems where true laminar flow conditions can be achieved.

There is a great diversity of mixing driers available, at almost any desired scale of operations which meet the foregoing criteria with a capability of either batch or continuous operation in the context of the present procedure. As a general rule batch operation is less expensive.

The surface barrier coating in the present invention may be any one of a wide diversity of materials which meet the requirements of the intended function. It is required that the surface barrier coating be a free flowing solid at the temperature and pressure of the drying operation, that it not react chemically with the microspheres, or with the other constituents of the system, e.g. the wetting agents and related components of the wet cake and, at the temperature of the expansion, that it function to separate the microspheres undergoing expansion so that they do not come into contact and bond to one another.

The surface barrier coating may be selected from one or more components meeting the following general characteristics:

The barrier coating material should be a finely divided particulate or fibrous material. It may be spherical or irregular in shape, and it may be a solid or a hollow particle.

The barrier coating material should be a free-flowing solid under the processing conditions of the present invention. It should have a melting point, for example, above the temperature of the drying process, generally above about 250° C.

The barrier coating material must be finely divided enough to be able to effectively blend with and adhere to the surfaces of the microspheres. The maximum major dimension of the particle size should preferably be no larger than about the diameter of the expanded microspheres, and preferably less. The minor dimensions will generally be as small as possible, commonly having a de factor lower limit of effectively about 0.01 micrometers.

While the barrier coating material may be either organic or inorganic, there are ordinarily considerable advantages to the employment of inorganic materials as at least a substantial component of the surface barrier coating. Such materials are commonly available in the dimensions of interest, they are common inclusions along with the microspheres in a wide diversity of syntactic foam formulations, they pose few problems in compounding and formulating end uses of the microspheres, and they are generally less expensive. It is also generally easier to assure that the barrier coating material does not itself develop undesirable characteristics in the processing, i.e., by becoming tacky itself or the like.

The surface barrier coatings are desirably materials which are pigments, reinforcing fillers, or reinforcing fibers in polymer formulations and thus are commonly used in the formulations where the microspheres are to be used. For example, calcium carbonate, calcium oxide, barium sulfate, alumina, such as particularly alumina tri-hydrate, silica, titanium dioxide, zinc oxide, and the like may be employed. All these are typical and illustrative of the commonly employed materials in simulated marble compositions, and those of ordinary skill in the art will be familiar with others that can also be suitably employed. As already noted, calcium carbonate is generally preferred.

The selection of suitable surface barrier coatings among the wide diversity of materials that meet the general characteristics required of such materials is generally a matter of balancing a number of functional requirements in the procedure and in the context of the intended uses of the product. Among the criteria that will guide those of ordinary skill in the art are the following:

The primary function of the surface barrier coating is to prevent the microspheres from coming into direct contact with one another and with the surfaces of the processing equipment during expansion and thus to prevent them adhering. The barrier coating material becomes thermally bonded to the surface of the microspheres, and forms a barrier between the thermoplastic material and any other materials with which it might otherwise come into contact.

Since the microsphere processing is being conducted for a particular, known end use, it is possible to tailor the selection of the surface barrier coating to the requirements of use. It is generally desirable to consider the surface barrier coating as a unit for unit replacement for the same material, i.e., normally calcium carbonate, in the intended use. As those of ordinary skill in the art will readily recognize, the fact that the surface barrier coating will adhere to the surface of the microspheres may be a factor that will require adjustment of proportions, but such requirements will not ordinarily be substantial or critical.

When combinations of different materials are employed as the surface barrier coating, it is possible to stay within the compounding requirements of virtually any designed formulation.

By virtue of the higher density of the surface barrier coating than that of the expanded microspheres, the composite product has a greatly reduced tendency to become entrained in gas streams or in the environmental atmosphere. As those of ordinary skill in the art will readily appreciate, the tendency to dusting is a material safety hazard, both in terms of exposure to workers and in terms of fire and explosive hazards. Since the microspheres contain an alkane blowing agent in substantial proportions, large quantities of these materials in the atmosphere presents a substantial problem in some circumstances. These difficulties, and the effort and expense of their resolution are minimized or eliminated altogether in the present invention.

Generally, the greater the density of the surface barrier coating, and the greater its proportion in the composite, the greater the reduction in the dusting problem. Since the major proportion of the product on a weight basis may be the surface barrier coating, addition of a high density surface barrier coating to the system can effectively eliminate any dusting problems.

By virtue of the increased density of the composite, the demands on the processing equipment and system in recovering the expanded and dried microspheres is greatly facilitated, and product losses are substantially reduced.

The surface barrier coating is used in the present invention in an amount sufficient to permit the expansion of the microspheres without sticking to the equipment employed or forming agglomerations of microspheres. While this amount will vary depending on the particular equipment employed, and with the particular processing conditions, the surface barrier coating will most often be in the range of about 20 to 97 weight percent of the mixture of barrier coating material and microspheres, on a dry weight basis. As a general rule, in most circumstances the amount employed should be the least amount that will reliably and consistently achieve the defined function of the barrier coating material. It is generally preferred that the barrier coating material be employed in amounts less than 90 and preferably less than 80 weight percent of the blend. This normally results in a dry expanded product which is more than 90 volume percent microspheres.

Since the predominant concerns in most uses of microspheres is with the volumetric proportions, even quite considerable proportions by weight of the surface barrier coating can be included without detriment in the end use of the present invention. When substantial amounts of the surface barrier coating are introduced as a component of the microsphere formulation, appropriate allowances for this component should be made in the compounding of materials in forming the simulated marble products.

An excess of the minimum amount of surface barrier coating required to prevent agglomeration may be employed when desired, but it is generally desirable to avoid proportions substantially greater than the amount which will adhere to the surface of the microspheres.

In the present method, drying of the microspheres is accomplished by heating with active high speed, high shear mixing, optionally at low pressure, in the presence of the surface barrier coating. The term heating is employed in the present application to connote heating or drying involving procedures other than direct heat exchange in a heated fluid, particularly not in a heated gas stream. Contact drying processes employing indirect heat exchange are generally well known, but in the context of the present procedure, must be adapted to accommodate the particular and unusual conditions of operation, as described infra.

The drying operation is conveniently conducted in a plow mixer, such as those available from Littleford Bros., Inc., of Florence, Ky. These mixers produce the high speed, high shear mixing required to achieve complete dispersion and intermixing of the microspheres and the surface barrier coating, and provides the heat exchange capacity to effectively remove the water from the mix. The mixer is vented to provide for removal of water and other volatiles under reduced pressure or vacuum.

High shear mixing is employed in the drying and mixing step. In prior processes, high shear was avoided to prevent rupture of the microsphere beads, particularly at higher temperatures employed to soften the surface of the beads to achieve expansion. We have observed that at the lower temperatures employed for the drying operation, the beads are not ruptured at quite substantial shear levels.

In the drying equipment employed in the present disclosure, for example, a six inch rotating blade or disk mill ordinarily operated at about 3600 rpm, producing a tip velocity of about 5,600 ft/min (about 86 meters/sec.) is conveniently employed projecting into the mixing chamber. Such high speed mills are generally familiar to those of ordinary skill in the art. In operation, the plow mixer operates to "mechanically fluidize" the blend, and to transport the materials throughout the mixing chamber, including into the high speed mill.

We observe that the operation of the plow mixer without the high speed mill is generally not sufficient to eliminate agglomerates in the final product. With the high speed mill, the product is obtained substantially free of agglomerates, i.e. agglomerates constitute less than 1%, and often less than 0.1%, of the total product.

It will be clear to those of ordinary skill in the art that the term "high shear" as employed in the present method is ultimately a functional term, signifying a level at least sufficient to eliminate aggregates in the dried product, and less than the level at which significant disruption of the beads occurs. Specific values of the minimum and maxima will be dependent on the specific equipment employed and the particular conditions of its usage and operation.

The plow mixer is operated at temperatures below which expansion occurs, affording exceptional control over the process. When mixing and drying are complete, the surface barrier coating will form a substantially homogeneous blend with the microsphere beads substantially free of agglomeration.

The equipment selected for use must, rather evidently, provide for adequate heat transfer to remove substantially all the water from the feed stock. The significant control parameters for any given equipment will be residence time, pressure, and heat input, normally based on operating temperature for convenience. At the residence time and pressure employed, heat exchange sufficient to achieve water removal within the constraints of the temperature limitations of the microspheres, and must remain below the temperature at which expansion occurs or at which the surface of the microspheres become tacky. Most equipment of interest will be adapted to receive steam as a heat source, which may be conveniently employed to assure temperature, typically of at least about 10 to 15° C. below the $T_g$ of the bead polymer. Longer retention times are wasteful and unnecessary but are not detrimental to the microsphere product.

The microsphere beads can be dried and blended with the surface barrier coating in a mixture substantially free of agglomerates. Such a result is achieved by drying at temperatures below that at which the microspheres soften, and where the internal pressure of the blowing agent is less than that needed to cause expansion, combined with the high shear mixing. Since the microspheres typically expand at temperatures on the order of about 120° C. or higher, drying can proceed effectively at lower temperatures.

It is possible to conduct the drying operation at reduced pressure to accelerate the rate of the water removal, although not always required. Thus, in the present procedure pressures from ambient to as low as 1 mm Hg absolute have been employed with success. As those of ordinary skill in the art will readily recognize, the balancing of time, temperature, and pressure can be readily adapted to the substantially complete removal of the water, low pressure drying is not mandatory for low temperature operations at which the expansion of the microspheres does not occur.

In a separate, subsequent operation, the microspheres in dry, free flowing form and blended with the surface barrier coating are expanded to the required density. The microsphere component can be expanded to a density as low as about 0.015 grams per cubic centimeter. In the same operation, the barrier coating is thermally bonded to the surface of the microsphere beads.

By separating the expansion step from the mixing and drying operations, far simpler and more reliable control of operations is achieved in far simpler and less expensive equipment, with far higher productivity.

The expansion can be carried out in any convenient equipment, in either batch or continuous operations suited to effect heat transfer to the microspheres. Since the adherence of the surface barrier coating is achieved at expansion temperatures, and since the water was previously removed, only the thermal requirements for expansion need to be considered and controlled.

It has been found that the homogeneous blend produced in the drying mixture can be expanded with low shear mixing to aid in uniform and efficient heat transfer by indirect heat exchange in very simple and inexpensive equipment. High speed, high shear mixing is not required in the expansion operation, so long as the drying step has reduced agglomerates and achieved sufficient homogeneity in the blend.

While the expansion can be conducted in the plow mixer employed in the drying operation, it will generally be desirable to expand, continuously if desired, in faster, less expensive equipment. Suitable for such use are the Solidaire ® continuous heat transfer units available from Bepex Corporation of Rolling Meadows, Ill.

The expansion equipment must provide the energy for the expansion alone. This is not large, and in most circumstances achieving a bead temperature (depending on the specific polymer) at which expansion occurs, as previously defined, there will be little difficulty in attaining the desired degree of expansion. In most circumstances, full expansion is desired, i.e., to a microsphere density of less than 0.03 g/cm³, preferably about 0.02 g/cm³ (without the surface barrier coating).

The important temperature limitations are defined by the thermoplastic polymer. It is important not to melt the polymer mass, so that the hollow spherical structure is lost through over expansion. On the other hand, if the temperature is not high enough to soften the polymer and to develop an adequate pressure of the blowing agent, expansion may not occur, or may be insufficient. Residence time at the appropriate temperature is also a useful control parameter, since there is a definite duration of the expansion process. Even when adequate temperatures are achieved, if the residence time at temperature is too short, the expansion may be insufficient. If the time is too long, the microspheres themselves may be over-expanded and disrupted, leaving broken spheres and polymer fragments and grit in the product, with attendant losses of production. While heat transfer rates are generally dependent on the specific equipment employed, residence times on the order of 0.5 to 3 minutes are often sufficient.

The temperatures for expansion are generally near, but not materially above, the glass transition temperature of amorphous materials and the melting temperature of crystalline polymers. These matters are discussed in more detail in the Morehouse patent.

It is the function of the surface barrier coating during expansion to prevent the formation of aggregates of the microspheres to the maximum attainable degree. In most equipment this particular requirement is facilitated by the use of continuous, low shear mixing of the material in the expander. Effective mixing also promotes even and uniform heat transfer to the particulate materials.

The degree of expansion can range from substantially none, to the known limits of expansion. This parameter is determined by the temperature, the residence time at temperature, and to a lesser degree, by the pressure in the system.

Expansion requires that the blowing agent develop a substantial internal pressure (as compared with the external pressure), and that the polymer become softened enough to flow under the effect of the internal pressure. This generally means that the polymer must be heated to a point near its melting or glass transition temperature, or very slightly above. If the polymer temperature is too high, the microspheres will over-expand, burst, and collapse. The upper limit of temperature should be about 160 to 180° for the co-polymer beads, and preferably no higher than 120 to 150° for polyvinylidene chloride. At higher temperatures, the residence time at temperature should be brief.

As the temperature is raised to the point at which the microspheres begin to soften and expand, and their surface area becomes tacky, the surface barrier coating bonds to the surface and prevents agglomeration, and good mixing operates to maximize the extent of heat transfer to the microspheres at this stage in the process. The extent of the mixing is not narrowly critical, so long as the mixing maintains a uniform, substantially homogeneous blend of surface barrier coating and microspheres and relatively even heat transfer is obtained.

It is generally preferred to permit the dried and expanded microspheres to cool before they are collected and handled. This minimizes the degree to which handling can disrupt the bead structure while the polymer is in the plastic state. Active cooling may be employed if desired.

The resulting dry microspheres can be conveniently recovered from the expander, collected and handled by entirely conventional procedures and equipment usually employed in such operations for dealing with powdered or granular materials.

The microspheres will have an adherent surface deposit of the surface barrier coating. When an excess of the surface barrier coating is used, there may be an additional amount of free material entrained in, but not bound to the surface of the microspheres. The particulate or fibrous material may form a discontinuous layer on the surface, although it is preferred that the barrier layer completely coat the surface in a substantially continuous layer. By varying the proportions of the barrier coating material and the microspheres, either condition may be attained.

The microspheres of the present process will often have a low incidence of deformed, non-spherical shapes when compared to the dried and expanded microspheres from the processes of the prior art. It has been found that the level of disrupted microspheres, where the hollow structure with a continuous form is broken, are not frequent, and are as low or even lower than the norms of the prior art processes.

The composite microspheres are a dry, free-flowing powder, ordinarily having less than about one weight percent moisture. Because there will still be a residuum of the "wetting agents" remaining from the limited coalescence process by which the microspheres were made, the product will be slightly hygroscopic, and unless protected from ambient moisture, will gradually take up additional water. The materials involved are not so strongly hygroscopic, however, that this is a large problem. In most circumstances, unprotected microspheres will tend to stabilize at a water content of about 1.5 weight percent or less. The microspheres will remain a free flowing powder even under such conditions.

The microsphere component can be expanded to very near the limit of expandability, i.e., to a density of less than about 0.03, often 0.02 or even 0.015 g/cm³. Higher densities are also possible. When the barrier coating material is taken into account, the composite density will, of course, be higher. Thus the composite density of the product will be determined by the density of the particular barrier coating material employed, the amount of the barrier coating material included, and the degree of expansion. Those of ordinary skill in the art will be able to readily determine the composite density of the product from the information and guidance provided in the present disclosure.

Most importantly, the dry expanded beads will have less than one percent, and often less than 0.1 percent agglomerates. This condition signifies that at least about 99 percent of the product, and preferably at least about 99.9 percent, will pass a 100 mesh screen. This compares to the prior art dry expanded beads produced by our prior method or by spray drying where acceptable results have represented product wherein from 3 to 10 percent is retained on an 80 mesh screen, while only about 97 percent, and often as little as 90 percent will pass a 100 mesh screen. In many circumstances, particularly when the microspheres exceed about 30 weight percent of the blend, even higher levels of agglomerates, well in excess of 10 percent of the product, may be retained on the 80 mesh screen by other procedures. The very low level of agglomerates is attained up to 80 percent by weight microspheres (in excess of 99 percent by volume). Such low proportions of the surface barrier coating may be highly desirable in some applications of the product.

In the event the curing system of the binder polymer includes any material which can dissolve, swell, or otherwise attack the microsphere polymer, such as styrene or the like, the microspheres should be pre-coated with a suitable protective coating. Such protective coating may be the polymer resin free of the component which attacks the microspheres, a thin coating of a polymer coating different from the polymer binder resin, but compatible therewith, or a barrier coating of a material which preferentially wets the microspheres and which does not interfere with the adherence of the polymer binder system or its wetting of the barrier coating material on the surface of the microspheres, or the bond achieved. A material which preferentially wets the microsphere polymer, but which does not wet the barrier coating material is particularly convenient. Aliphatic alcohols, particularly those containing from about 4 to about 12 carbon atoms, are exemplary of such materials.

Since the microspheres employed in the present invention are of such low density, the formulation of the casting composition may be carried out as if they were voids in most circumstances, and the relative proportions of the balance of the ingredients can be determined, in general, independently of the presence of the microspheres in most circumstances. An adjustment reducing the proportions of the calcium carbonate and increasing the proportion of the resin system may be helpful in assuring adequate bonding of the surface of the composite microspheres in the binder polymer, particularly in light of the high surface area of these materials. Those of ordinary skill in the art are familiar with the proportions to be employed in the formulation of such compositions.

The relative proportions of the composite microspheres to the balance of the molding formulation can be varied quite broadly to suit the weight requirements of a particular application, and to achieve other physical characteristics in the molded product in accordance with the present invention. In general terms, the greater the proportions of the composite microspheres, the greater the benefits in the formulation, up to the capacity of the balance of the casting formulation to form coherent moldings or castings. There is no lower limit except that imposed by the particular weight savings sought in usage of the present invention. Most often, usage of less than about 30 volume percent of the composite microspheres will not be of general interest. It will be possible in most circumstances to employ the composite microspheres in proportions of up to about 65 or 70 volume percent of the total formulation in most polymer binder systems. Amounts of about 35 to about 60 volume percent composite microspheres are generally preferred, and about 45 to about 55 volume percent are most preferred.

The formulations of the casting composition according to the present invention do not impose any special or particular requirements on the mixing of the formulations. Indeed, the composite microspheres employed in the present invention are far more durable under and tolerant of mixing conditions than the hollow ceramic spheres heretofore employed, and more vigorous mixing may be employed if desired. Those of ordinary skill in the art are familiar with the techniques to be employed in the mixing of such compositions.

The formulations of the casting composition according to the present invention do not impose any special or particular requirements on the casting and molding of the formulations. Indeed, the composite microspheres employed in the present invention are far more durable under and tolerant of casting and molding conditions than the hollow ceramic spheres heretofore employed, and more vigorous casting and molding may be employed if desired. Those of ordinary skill in the art are familiar with the techniques to be employed in the casting and molding of such compositions.

As those of ordinary skill in the art will readily recognize, all the usual techniques in the art may be employed. For example, the mold employed in use of the formulations of the present invention may be coated with mold release compositions, and with gel coat formulations prior to the filling of the mold with the casting or molding formulations of the present invention, and otherwise processed in the fashion familiar to the art.

It is important that the cure of the polymer binder resin and system be controlled to avoid the employment of temperatures which will cause the microspheres to burst or rupture. The upper limit of the temperature should be maintained below the glass transition, and preferably at least about 10° C., and more preferably at least about 20° C., below the glass transition temperature of the polymer which forms the microspheres.

As those of ordinary skill in the art will understand, through the selection of a curing system for the particular binder polymer employed, and control of the conditions of cure, it is possible to achieve fully satisfactory cure of the resin system without excessive temperature, although such curings systems may be slower than other, higher temperature operations.

All the techniques of finishing, working, trimming, shaping, and other procedures common to the fabrication of cast or molded products and their installation familiar to those of ordinary skill in the art may be employed with such products in the present invention. Indeed, the characteristics of the cast or molded products of the present invention will prove easier to work, and will be less susceptible to chipping, cracking, or other fractures which occur with such products made in accordance with the prior art.

A vinylester resin based casting will typically be formed by the following procedure:

Composite microspheres coated with calcium carbonate are combined with calcium carbonate in a drum mixer and are blended to a substantially homogeneous physical blend. By volume, the composite microspheres are 2/3, and the particulate calcium carbonate is 1/3, of the blend.

The appropriate measure of resin is charged to a mixing vessel. While mixing, 3 parts by volume of the blend of composite microspheres and calcium carbonate are added gradually for each part by volume of the vinylester resin polymer. Mixing is continued until a substantially uniform blend of the materials is observed. A free radical catalyst curing system for the vinylester resin polymer is added slowly while the mixing is continued until the catalyst is also uniformly mixed throughout the mixture.

The blend is a thick pasty mass, which is then employed to fill a mold in conventional fashion. The formulation is maintained in the mold until cross-linking is substantially complete, and the molded part is then removed from the mold.

The molded part shows light weight, and excellent physical properties and conformity to the shape of the mold.

What is claimed is:

1. A simulated marble produce comprising a cast or molded article formed of a polymeric binder, an inert filler predominantly comprising calcium carbonate, and from about 15 to about 70 volume percent of a low density filler comprising hollow thermoplastic microspheres having a density of less than about 0.06 grams per cubic centimeter, and a surface coating of an inert particulate or fibrous barrier material thermally bonded thereto.

2. The product of claim 1 wherein said polymer binder is a cross-linked thermoplastic polymer resin.

3. The product of claim 1 wherein said calcium carbonate is fibrous.

4. The product of claim 1 wherein said microspheres are a polyvinylidene chloride polymer.

5. The product of claim 4 wherein said polyvinylidene chloride polymer is a homopolymer.

6. The product of claim 4 wherein said polyvinylidene chloride polymer is a copolymer of vinylidene chloride and acrylonitrile.

7. The product of claim 4 wherein said, polyvinylidene chloride polymer is a terpolymer of vinylidene chloride, acrylonitrile and divinyl benzene.

8. The product of claim 1 wherein said inert particulate or fibrous barrier material is calcium carbonate.

9. The product of claim 1 wherein said microspheres and bound inert particulate or fibrous barrier coating comprise from about 35 to 60 volume percent of said product.

* * * * *